(12) United States Patent
Theisinger et al.

(10) Patent No.: US 11,561,067 B2
(45) Date of Patent: Jan. 24, 2023

(54) DUAL SIGHT SCOPE

(71) Applicants: Hermann Theisinger, Vienna (AT); Mario Moll, Izgrund (DE)

(72) Inventors: Hermann Theisinger, Vienna (AT); Mario Moll, Izgrund (DE)

( * ) Notice: Subject to any disclaimer, the term of this patent is extended or adjusted under 35 U.S.C. 154(b) by 19 days.

(21) Appl. No.: 17/145,051

(22) Filed: Jan. 8, 2021

(65) Prior Publication Data
US 2021/0215458 A1   Jul. 15, 2021

Related U.S. Application Data

(60) Provisional application No. 62/959,386, filed on Jan. 10, 2020.

(51) Int. Cl.
*F41G 1/38* (2006.01)
*G02B 7/02* (2021.01)
*G02B 23/16* (2006.01)

(52) U.S. Cl.
CPC .............. *F41G 1/38* (2013.01); *G02B 7/023* (2013.01); *G02B 23/16* (2013.01)

(58) Field of Classification Search
CPC ............ F41G 1/38; G02B 7/023; G02B 23/16
See application file for complete search history.

(56) References Cited

U.S. PATENT DOCUMENTS

| | | | | |
|---|---|---|---|---|
| 4,247,161 A * | 1/1981 | Unertl, Jr. | ................. | F41G 1/38 42/122 |
| 4,561,204 A * | 12/1985 | Binion | ..................... | F41G 3/06 D16/132 |
| 4,618,221 A * | 10/1986 | Thomas | .................... | F41G 1/38 359/428 |
| 4,841,659 A * | 6/1989 | Williams | .................. | F41G 1/10 D22/109 |
| 5,771,595 A * | 6/1998 | Bell | ........................ | G02B 23/14 42/122 |
| 7,793,456 B1 * | 9/2010 | Lacorte | ..................... | F41G 1/24 42/122 |
| 8,240,075 B1 * | 8/2012 | Mullin | .................. | F41G 11/003 42/122 |
| D676,096 S * | 2/2013 | Gambino | ..................... | D22/109 |
| D741,446 S * | 10/2015 | Cheng | .......................... | D22/109 |
| 9,322,616 B2 * | 4/2016 | Craven | ............. | H04N 5/22525 |
| 9,435,611 B1 * | 9/2016 | Jahromi | .................. | F41G 11/00 |
| 10,061,112 B1 * | 8/2018 | Murphy | ............. | G02B 27/0189 |
| 2005/0268521 A1 * | 12/2005 | Cox | .......................... | F41G 1/38 42/130 |
| 2012/0030985 A1 * | 2/2012 | Mauricio | ................ | G02B 23/10 42/84 |
| 2014/0123532 A1 * | 5/2014 | Russ | ....................... | G02B 23/14 42/113 |

(Continued)

*Primary Examiner* — Joshua E Freeman
(74) *Attorney, Agent, or Firm* — Ian Burns; ATIP Law

(57) ABSTRACT

To enable a user to quickly adjust power ranges of a scope for firearms, a scope may be provided with a primary sight having a primary sighting line and a secondary sight having a secondary sighting line. The primary sight may include a plurality of optical elements disposed within the first housing and an elevation adjustment mechanism for adjusting a zeroed-in position of the primary sight. To prevent impedance of the secondary sighting line, the elevation adjustment mechanism may be located laterally of the primary sight rather than in the conventional position above the primary sight.

15 Claims, 9 Drawing Sheets

(56) References Cited

U.S. PATENT DOCUMENTS

| | | | |
|---|---|---|---|
| 2014/0230306 A1* | 8/2014 | Arachequesne | F41G 1/38 42/119 |
| 2014/0259853 A1* | 9/2014 | Crispin | F41G 1/387 42/124 |
| 2015/0128472 A1* | 5/2015 | Theisinger | F41G 1/38 42/122 |
| 2015/0292837 A1* | 10/2015 | Cheng | F41G 1/38 42/123 |
| 2017/0030681 A1* | 2/2017 | Liang | F41G 1/473 |
| 2017/0321993 A1* | 11/2017 | Crispin | G02B 23/14 |
| 2018/0023922 A1* | 1/2018 | Walker | G02B 23/14 42/122 |
| 2018/0024376 A1* | 1/2018 | Dohr | G02B 23/14 345/7 |
| 2018/0073840 A1* | 3/2018 | Kristoffersen | F41G 1/38 |
| 2018/0080738 A1* | 3/2018 | Patton | F41G 11/003 |
| 2018/0306554 A1* | 10/2018 | Patton | F41G 11/003 |
| 2019/0376765 A1* | 12/2019 | Hamilton | G02B 7/023 |
| 2020/0011640 A1* | 1/2020 | Moseman | F41G 3/165 |
| 2020/0018566 A1* | 1/2020 | Tubb | F41G 1/473 |
| 2020/0232765 A1* | 7/2020 | Patton | F41G 1/545 |

\* cited by examiner

DUAL SIGHT SCOPE

CROSS REFERENCE TO RELATED APPLICATIONS

This application claims priority to U.S. provisional patent application Ser. No. 62/959,386, filed Jan. 10, 2020, the entire contents of which are herein incorporated by reference.

FIELD OF THE INVENTION

The present invention relates to scopes for firearms.

BACKGROUND

Telescopic sights such as riflescopes are often used at varying distances from very close ranges of under 30 meters to very long distances to 300 meters and beyond. In order to provide the fitting magnifications to such varying ranges, known designs allow for power changing zoom systems where a suitable power setting may be manually selected. This can be of disadvantage though when the power change needs to be done very fast. Other known systems are combining two separate optical products like a 1-power open sight and a magnifying telescopic sight by means of mounts. In this case the user has to move his head up and down between the two exit pupils in order to switch magnifications, which is not ergonomic.

What is required is an improved telescopic sight.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to provide a scope with a tilted eye piece;
the ability to mount a secondary sight to a scope;
the ability to switch between two optical systems with only minimal head and/or eye movement;
provide an elevation adjustment for a primary optical sight that does not interfere with or impede a line of sight through a secondary optical sight.

These and other advantages may be realized by reference to the remaining portions of the specification, claims, and abstract.

Brief Description of One Embodiment of the Present Invention

In one aspect of the present invention, there is a provided a scope for firearms comprising a first housing, a primary sight disposed within the first housing and comprising a primary sighting line, and a secondary sight comprising a secondary sighting line. The primary sight comprises a plurality of optical elements disposed within the first housing. The scope comprises an elevation adjustment mechanism for adjusting a zeroed-in position of the primary sight, wherein the elevation adjustment mechanism is located such that it does not impede the secondary sighting line.

In one aspect of the present invention, there is provided a scope for use on a firearm. The scope may comprise first housing means and primary sight means disposed within the first housing means. The primary sight means provides a primary sight line and comprises a plurality of optical elements disposed within the first housing. Secondary sight means may provide a secondary sighting line. Elevation adjustment means may adjust a zeroed-in position of the primary sight. The elevation adjustment means may be located such that it does not impede the secondary sighting line of the secondary sight means.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

As described above, there is a problem of providing a sight for a rifle that can handle a large operative range and the ability to adjust that range quickly. As will be described herein, a rifle scope may be provided that includes two independent sighting systems that have independent zeroed-in positions. For one of the independent sighting systems, an eyepiece is tilted off-axis to the target image direction thus allowing for merging the exit pupil with the exit pupil of the other optical sight, e.g. a conventional optical sight, while both optical devices are lined up towards the same target. Thus, the operator can switch between the two sighting systems with only a minimal head and/or eye movement.

Sights require an ability to adjust for elevation (vertical) and windage (horizontal). This is typically achieved by moving the position of an aiming mark or reticle on one or more optical components within the sight, for example, on the erector components. Sports optical products typically carry the elevation turret on top (12 o'clock position) of the housing in order to tilt the light path and/or move the aiming mark upwards and downwards. For the dual sight arrangement to be described, the top position of the turret would obstruct the viewing over the sight through the secondary straight-view sight. Thus, there will also be described a system for providing elevation and/or windage adjustment on a dual-sight scope.

Figure 1:
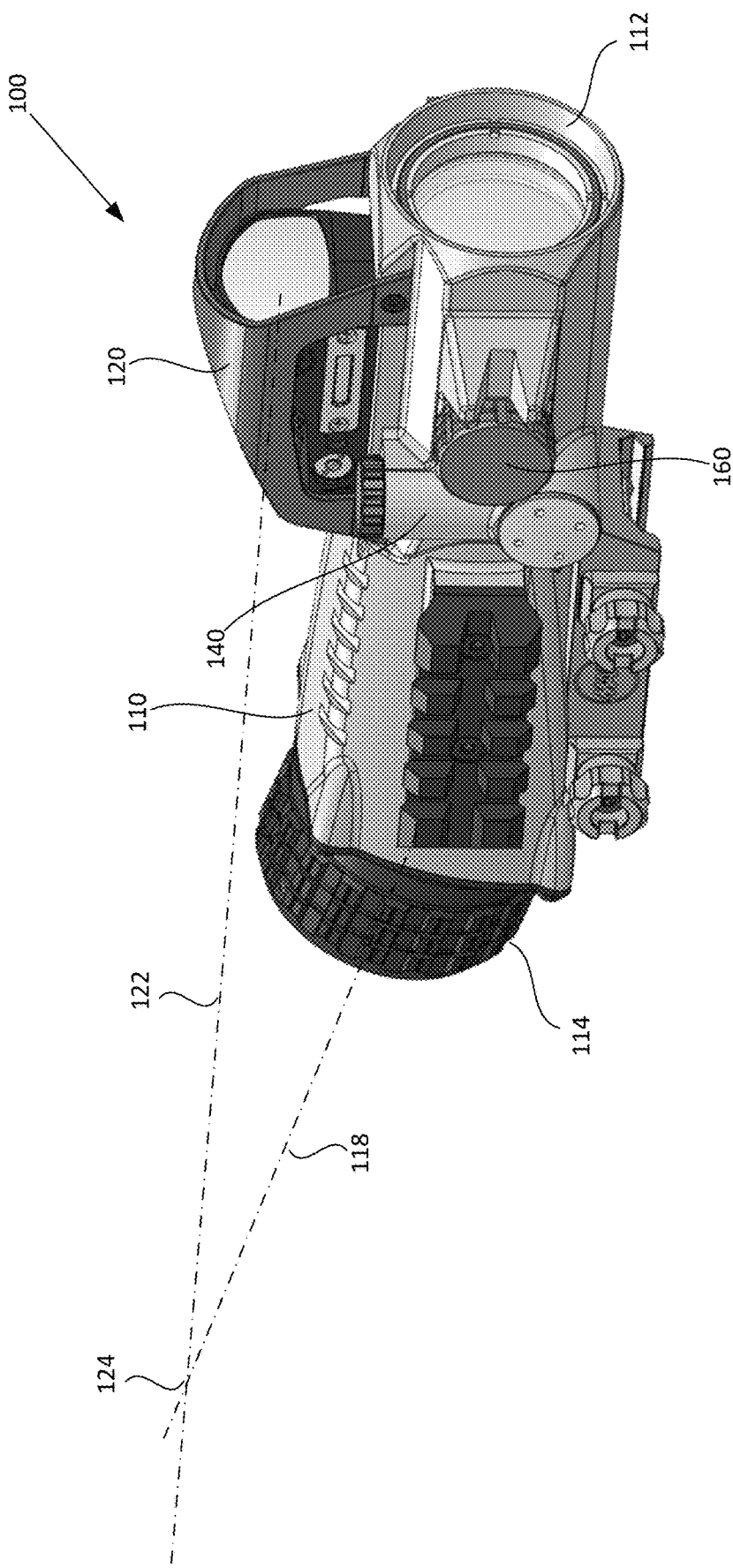
FIG. 1 is substantially a front perspective of a dual sight scope in accordance with an embodiment of the present application.

An embodiment of a scope for firearms in accordance with an embodiment of the present application is depicted generally at 100 in FIG. 1. The scope 100 includes an outer housing 110. The scope includes a primary sight within the outer housing 110 including a plurality of optical components. The primary sight includes one or more objective components toward an objective end 112 of the housing 110. The primary sight includes one or more ocular components toward an ocular end 114 of the housing 110. Between the objective components and the ocular components there may be one or more erector components. The ocular of the primary sight is tilted upwards, in the view depicted in FIG. 1. The primary sight has a sighting line 118 that is tilted upwards due to the ocular. The sighting line represents the direction along which the user looks to view the target through the sight.

The scope 100 includes a secondary sight 120 located above the outer housing 110. The secondary sight may have one or more optical components or may merely include one or more aiming marks. The secondary sight 120 has a second sighting line 122.

The primary sighting line 118 of the primary sight and the secondary sighting line 122 of the secondary sight 120 converge in a region 124 where the user would locate their eye when using the scope. Thus, the user can selectively switch between using the primary sight or the secondary sight 120 with minimal eye or head movement.

In use the primary sight will provide a first zeroed-in position making the firearm effective or accurate at a first target distance corresponding to the first zeroed-in position. Similarly, the secondary sight will provide a second zeroed-in position making the firearm effective or accurate at a second target distance corresponding to the second zeroed-in position. The user can use the primary or secondary sight to quickly switch between the two zeroed-in positions depending on the range of the target.

The primary sighting line 118 and the secondary sighting line 122 define a common sighting plane. When the scope 100 is mounted on the top of the firearm, the common sighting plane will be substantially vertical. As mentioned above, a typical optical scope includes an elevation turret located on top of the scope for providing elevation adjustments of the sight. It can be seen from FIG. 1 however, that any elevation turret located on top of the primary sight housing 110 would be located in the common sighting plane defined by the primary and secondary sighting lines and therefore would interfere with or impede the sighting line 122 of the secondary sight 120. It is possible to mount the secondary sight higher in the common sighting plane in order to be able to view the secondary sight over the vertical turret and through the secondary sight 120. This is a disadvantage as the user has to stretch further up to view through the secondary sight 120, which is uncomfortable and reduces precision of the firearm-sight combination due to the increasing distance between the bore axis of the rifle and the secondary sighting line 122. In order to provide an elevation adjustment, an alternative arrangement will be described herein.

As mentioned above, the primary sight will have a first zeroed-in position corresponding to a first target range. To adjust the first zeroed-in position, an elevation adjustment mechanism is provided. In an embodiment of the present application, vertical or elevation adjustment is provided by means of a side-wards offset turret, thus enabling an unobstructed view over the optical sight within the housing 110 and enabling a low mounting of the secondary sight 120 with all said advantages.

Optical sights are commonly fitted with an adjustment system that allows for shifting or tilting the target image, the aiming mark or both relative to the housing-mount unit thus enabling the user to zero the scope in to the selected target distance. Commonly the telescopic sight's erector system with aiming mark is tilted relative to the ocular by means of two spindles in a 90 degree angle configuration that push the erector tube unit against a spring mechanism consisting of one or more springs.

In an embodiment of the present application, a vertical or elevation adjustment mechanism 140 acts on an objective group comprising one or more objective lenses fitted within an internal objective housing. By actuation of the elevation adjustment mechanism 140, the inner housing is shifted or tilted relative to the erector system, aiming mark and/or ocular components. As is seen in FIG. 1, the adjustment mechanism 140 is laterally offset relative to the sighting lines 118, 122 of both the primary sight and the secondary sight, or out of the common sighting plane defined by the two sighting lines 118, 122. Thus, the user is able to use the sighting line 122 through the secondary sight without interference from the adjustment mechanism 140. The scope 100 also includes a lateral or windage adjustment mechanism 160 that is independent of the vertical adjustment mechanism 140.

Figure 2:
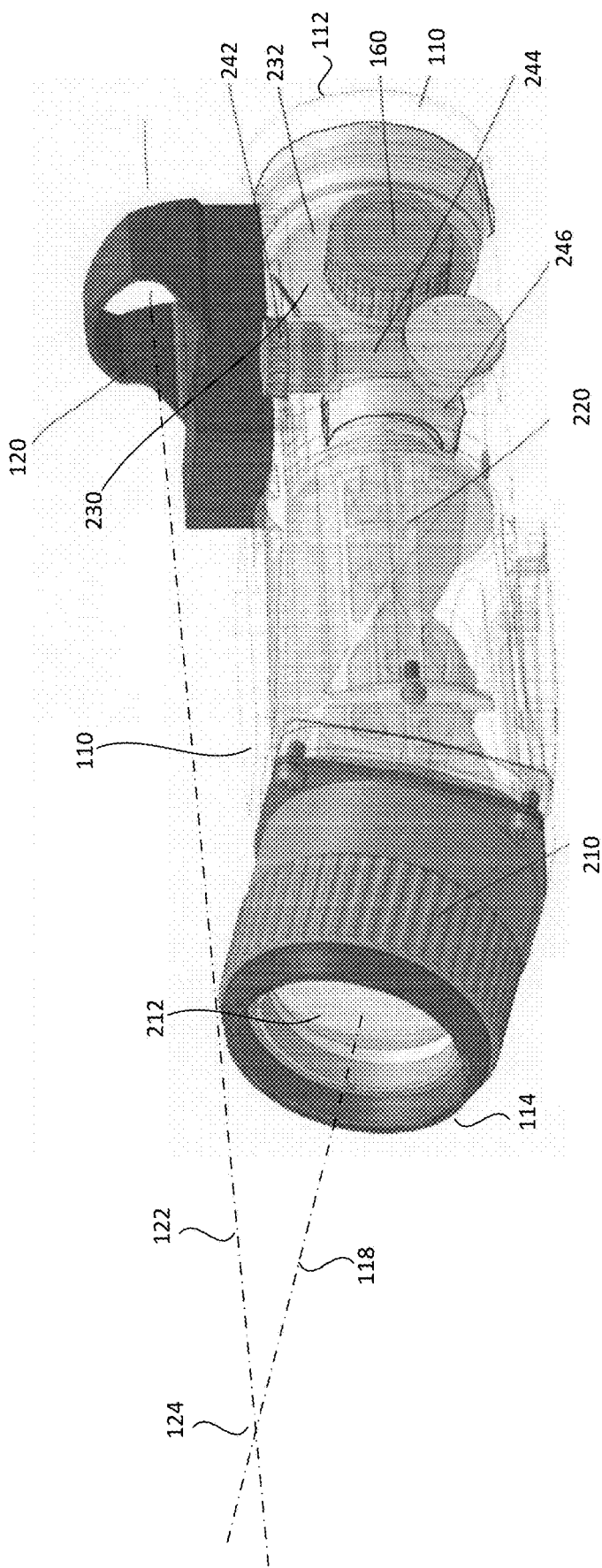
FIG. 2 is substantially a rear perspective of the dual sight scope with partial transparency of an outer housing.

FIG. 2 shows the scope 100 with partial transparency of the outer housing 110 to reveal the internal components of the scope 100. The scope 100 includes an ocular 210 with one or more ocular lenses 212 at the ocular end 114 of the scope 110. In front of the ocular 210, with respect to the usual sighting direction of the scope 100, there is an erector system 220 including one or more erector optical components. The erector group 220 may also include one or more aiming marks or reticules. Forward of the erector group is an objective system 230. The objective system 230, disposed at the objective end 112 of the scope 100, includes an inner housing 232 that is located within the outer housing 110. The inner housing 232 houses one or more objective optical components.

It will be appreciated by the person skilled in the art that the particular optical components employed for the objective group, the erector system and the ocular group are not particularly pertinent to the present application and a large variety of optical configurations can be utilized, depending on the requirements of the scope 100. One particular embodiment of components is shown in FIGS. 6 to 12.

Figure 6:
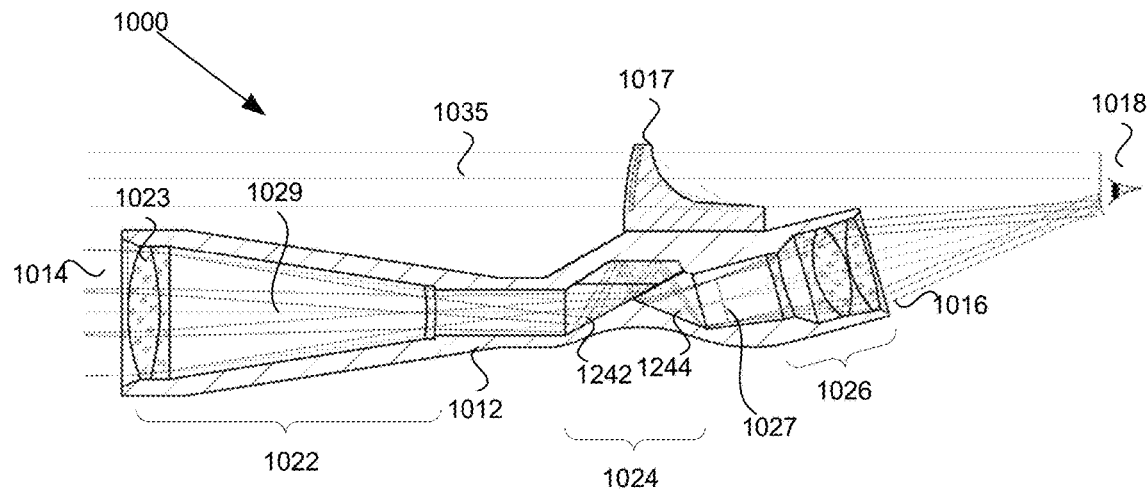
FIG. 6 is substantially a side view of one embodiment of the scope of the present invention.

In FIG. 6, there is schematic drawing of a tilted eye piece sight with optional secondary sight integrated or mounted onto the product. The sight 1000, which may be a telescopic sight in one embodiment, includes a housing 1012 having an objective end 1014 and an ocular end 1016. Light enters the objective end 1014 and traverses a series of optical components to the ocular end 1016. Light altered as it traverses the optical components exits the ocular end 1016 to be observed by a user 1018. Light exiting the ocular end 1016 is tilted with respect to the direction of entry into the objective end 1014. A secondary sight 1017 may be mounted on the top of the housing 1012. The secondary sight 1017 may be a 1-power open red-dot sight, though other secondary sights will be apparent to the person skilled in the art. The secondary sight 1017 may be mounted on the housing 1012 by any suitable means. In one embodiment, the secondary sight may be fully integrated (non-detachable) into the primary sight such that the housing 1012 is molded to accommodate the secondary sight. In an alternative embodiment, the secondary sight may be detachably mounted on the primary sight using clamps, rails, thread components, bayonet fittings, or similar attachments as are known in the art.

The optical components within the housing 1012 include an objective group 1022, an erector or prism group 1024, and an ocular group 1026. A reticle 1027 may be provided between the erector group 1024 and the ocular group 1026 or elsewhere as required. Each of these groups 1022, 1024, 1026 may include one or more individual optical elements housed within the housing 1012. For example, the objective group 1022 may include an objective lens 1023 which is the first lens that light entering the scope housing 1012 will encounter. In one embodiment, the objective lens 1023 may be a 32 mm diameter lens, though other objective lens sizes will be apparent to the person skilled in the art depending on the overall requirements of the telescopic sight. The ocular group 1026 provides an eye piece which is tilted at an angle of 3° to 40° from the objective optical axis. The ocular group may include one or more ocular lenses for focusing the light toward the eye of the user 1018 at a distance providing safe eye relief. For example, the ocular group may include a 23 mm exit lens that provides an eye relief of approximately 55 mm.

Design parameters for the objective and ocular groups are well known within the art and thus specific description of the objective and ocular groups is not considered pertinent to the present disclosure.

The erector group 1024 includes one or more optical components for tilting the optical axis as will be described in more detail below.

Figure 7:
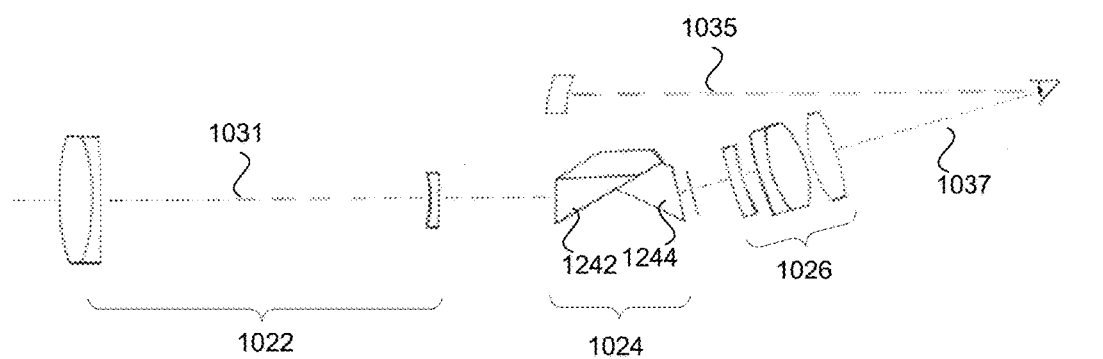
FIG. 7 is substantially a side cross section showing the tilting of the optical axis through the light path of the scope of FIG. 6.

FIG. 7 shows the respective light paths 1029, 1035 through the optical components of both the telescopic sight 1010 and the secondary sight 1017. FIG. 7 shows a simplified view of the optical axis. As can be seen in FIG. 7, the optical axis 1031 of the objective group 1022 is tilted by the erector group 1024 to the optical axis 1037 of the ocular group 1026. Light may pass through the secondary sight 1017 in a more conventional straight path (with internal alteration if required) to exit the secondary sight in a direction 1035 parallel with the entry direction. The optical axes 1037, 1035 of the telescopic sight 1000 and secondary sight 1017 merge or intersect in the vicinity of the eye of the user 1018. Thus, the user is able to swap their vision between the secondary sight 1017 and the telescopic sight 1000 by simple eye movements without having to move their head to re-align their eye with the optical axis of either the telescopic sight of the secondary sight.

By selection and design of the optical components, the exit angle of the telescopic sight may be adjusted as required to suit design needs.

The prism group 1024 is mounted within the housing 1012 between the objective group 1022 and ocular group 1026. In the embodiment depicted in FIG. 6, the prism group 1024 includes a first prism 1242 and a second prism 1244. The first prism 1242 may be a roof half-penta prism which is a relatively standard erector prism for telescopic sights used for reverse image reversal and rotation of the optical axis.

The second prism 1244 may be a re-shaped right angle prism, e.g. a triangle prism, that rotates the optical axis by the required amount.

The first prism 1242 and/or the second prism 1244 may be Abbe-Koenig, Schmidt-Pechan, Porro-prism type prisms, though other types of prisms will be apparent to the person skilled in the art.

Figure 8:
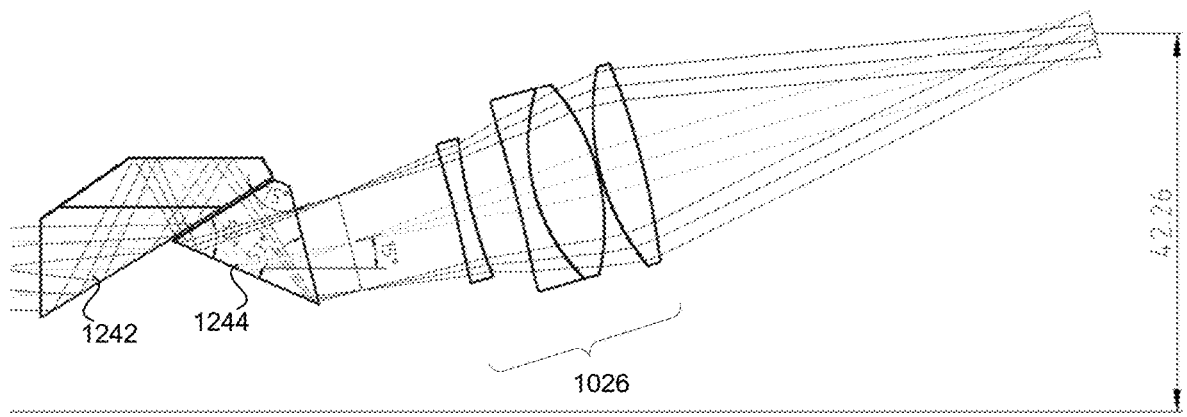
FIG. 8 substantially shows a prism group providing a 15° tilt angle.

FIG. 8 shows one embodiment of the prism group that creates a 15° tilt of the optical axis. The first prism 1242 provides a 60° change to the optical axis, e.g. 60° down ward from the horizontal. The second prism 1242 has a top angle of 75° and base angles of 53° to produce an overall tilt adjustment for the exit angle of 15° above the horizontal (i.e. 15° upward of the objective optical axis). This corresponds to an optical height at the eye relief distance of approximately 42 mm.

The optical height is relevant as follows. Any kind of long gun (rifles, shotguns) carries a stock which has to be 'cheeked' for precise shooting or at least supported by the shooter's shoulder. The shape of the stock pre-sets a 'workable' ergonomic sighting line of the shooters eye over the gun. The gun will typically carry a mount, such as a Picatinny or similar rail, onto which the sights are mounted. The typical height of the sighting line over the mount top surface is typically between 28 mm and 48 mm depending on the gun type, though values outside this range are also possible. If the design of the optical products forces the eye much higher than that, the shooting becomes very awkward. Good ergonomics is the basis for precise shooting and thus ensuring a correct optical height, e.g. height above the gun mount, is important.

Figure 9:
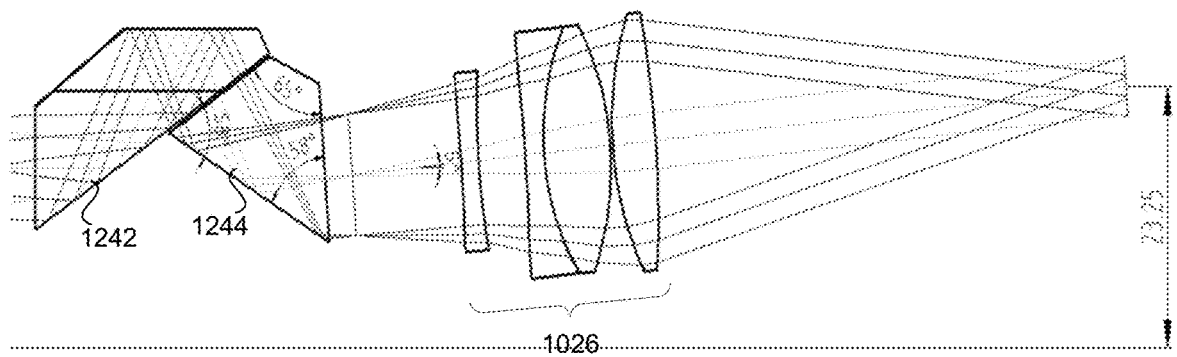
FIG. 9 substantially shows a prism group providing a 5° tilt angle.

As noted above, the exit angle can be modified by selection of the optical components, in particular the second prism 1244, to obtain any axis tilt angle (0-40 degree) and/or any desired max optical height (H) to fit a structure design and Red dot position of the secondary sight 1017. FIG. 9 shows an embodiment that produces a 5° tilt using a secondary prism 1244 having a top angle of 65° and base angles of 58° giving an optical height of approx 23 mm.

Figure 10:
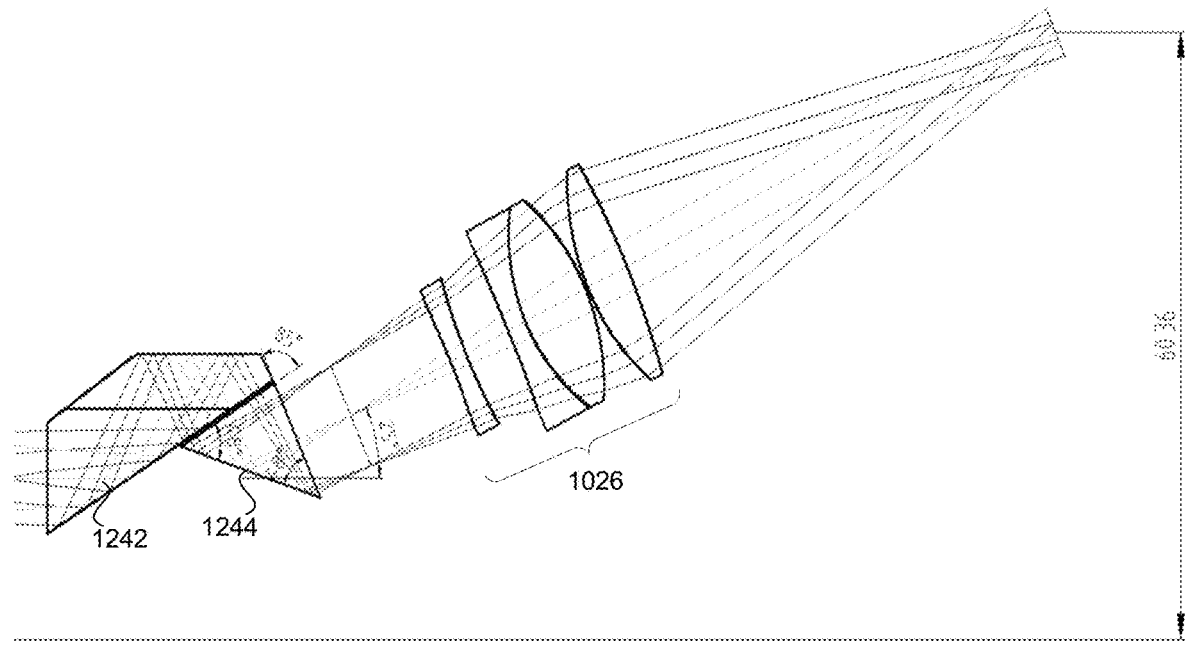
FIG. 10 substantially shows a prism group providing a 25° tilt angle.

FIG. 10 shows an embodiment toward the more tilted end of the scale that produces a 25° tilt angle using a secondary prism 1244 with top angle 85° and base angles of 48°, creating an optical height of 60 mm.

Figure 11:
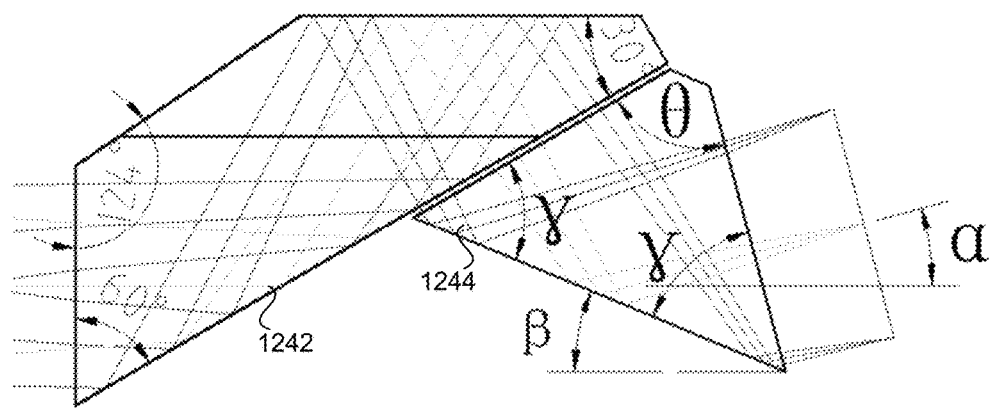
FIG. 11 substantially shows the geometric angle relationships of the prism group.

Virtually any exit angle α can be calculated using the geometric rules to match the 60° roof half-penta prism as shown in FIG. 11. There are equations about the triangle prism angle and tilt angle:

$$\alpha + 2\beta = 60 \text{ degree} \qquad (\text{eq. 1})$$

$$\gamma = 2\beta + 30 \text{ degree} \qquad (\text{eq. 2})$$

$$\theta + 2\gamma = 180 \text{ degree} \qquad (\text{eq. 3})$$

Following these rules, the secondary prism 1244 can be selected after the structure and cosmetic design to fit structure/cosmetic/Red dot position and to obtain a design in which the optical axis of the ocular coincides with the optical axis of the secondary sight 1017 at the desired position.

Figure 12:
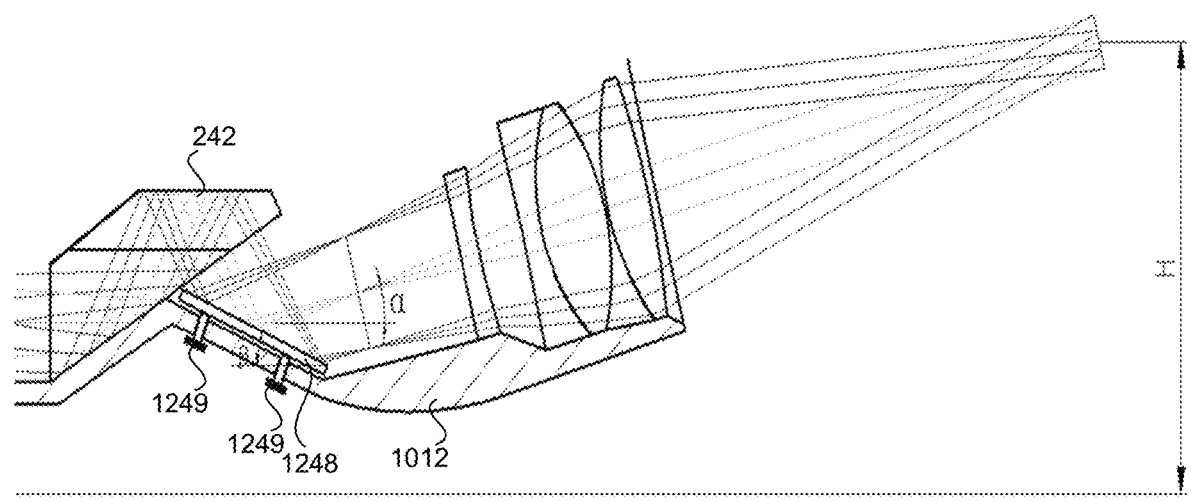
FIG. 12 substantially shows an erector group utilizing a mirror.

The above described embodiments make use of a secondary prism to perform the tilt of the optical axis. In an alternative embodiment, the second prism 1244 may be replaced with a mirror 1248 as shown in FIG. 12. The mirror 1248 may be mounted with a two-piece screw mounting 1249 that allows the angle to be adjusted accurately. The exit or tilt angle α is governed by the equation:

$$\alpha + 2\beta = 60 \text{ degree} \qquad \text{(eq. 4)}$$

Thus, the exit angle α can be controlled by controlling the mounting angle β of the mirror within the housing.

The objective system elements and erector system elements can be coated for enhanced light transmission in the normal visible light spectrum (400-700 Nm) as well as for non-visible spectrum from 700 Nm to over 1,000 Nm.

The optical components may be configured for magnification in the range of 1-times to 30-times, though other magnifications are possible. The telescopic sight may have a fixed power magnification, such as 2-times, 3-times, 4-times 5-times, 6-times, 7-times, 8-times, 9-times or 10-times, etc. or may have a zoom configuration allowing for variation in the magnification, e.g. from 1-power to 16-power or more.

The entry pupil may be in the range of 19 mm to 73 mm though values outside this range may also be contemplated within the scope of the invention.

The optical system may be equipped with one or more illuminated aiming marks. In one embodiment, the telescope sight and the secondary sight may be equipped with illuminated aiming marks while sharing a single power source.

The optical components may utilize one or more non-glass material lenses such as plastic lenses used in the photographic industry. One or more of the optical components may include one or more aspherical lens elements.

An advantage of the tilted eye piece system described above includes that the objective systems of the telescopic sight and the secondary optical system may be aligned towards a similar viewing direction but with the tilted eye piece's exit pupil orientated towards the secondary exit pupil in a way such that the user may easily switch between the two exit pupils with a minimum of head or eye movement.

The parameters of a specific 6×30 design of the telescopic sight may be as follows:

1. Objective lens diameter: 32 mm
2. Ocular Max Diameter (outer lens): 23 mm
3. Eye Relief: 55 mm
4. Exit Pupil Diameter: 5 mm
5. Field of view: 3.35°
6. Field of view @ 100 yards: 17.55 feet
7. Field of view @ 100 m: 5.85 m
8. Magnification: 6×
9. Max distortion: less than 0.5%
10. Max vignetting (at full field): 70%
11. Glass
12. Center resolution: better than 5.5"
13. Inner 2/3 field resolution: better than 6.5"
14. Full field resolution: better than 7.5"
15. Prism group: Roof half-penta and triangle prism (or mirror)
16. Axis rotate angle: 0-40 degree according to triangle prism angle (or mirror tilt angle).

The vertical adjustment mechanism 140 comprises a turret 242 in the form of a rotatable dial. The turret 242 engages an actuator or spindle 244. As is seen in FIG. 2, the turret 242 and actuator 244 are displaced or off-set sideways, i.e. laterally, of the sighting lines of the scope 100. The actuator 244 is connected to the inner housing 232 that houses the objective group 230 by a connector element 246. Rotation of the turret dial 242 raises and lowers the connector element 246 in a manner to be described, which shifts the position and/or angle of the inner housing 232 and its objective lens elements relative to the erector system 220 and the aiming mark(s) contained therein.

Figure 3:
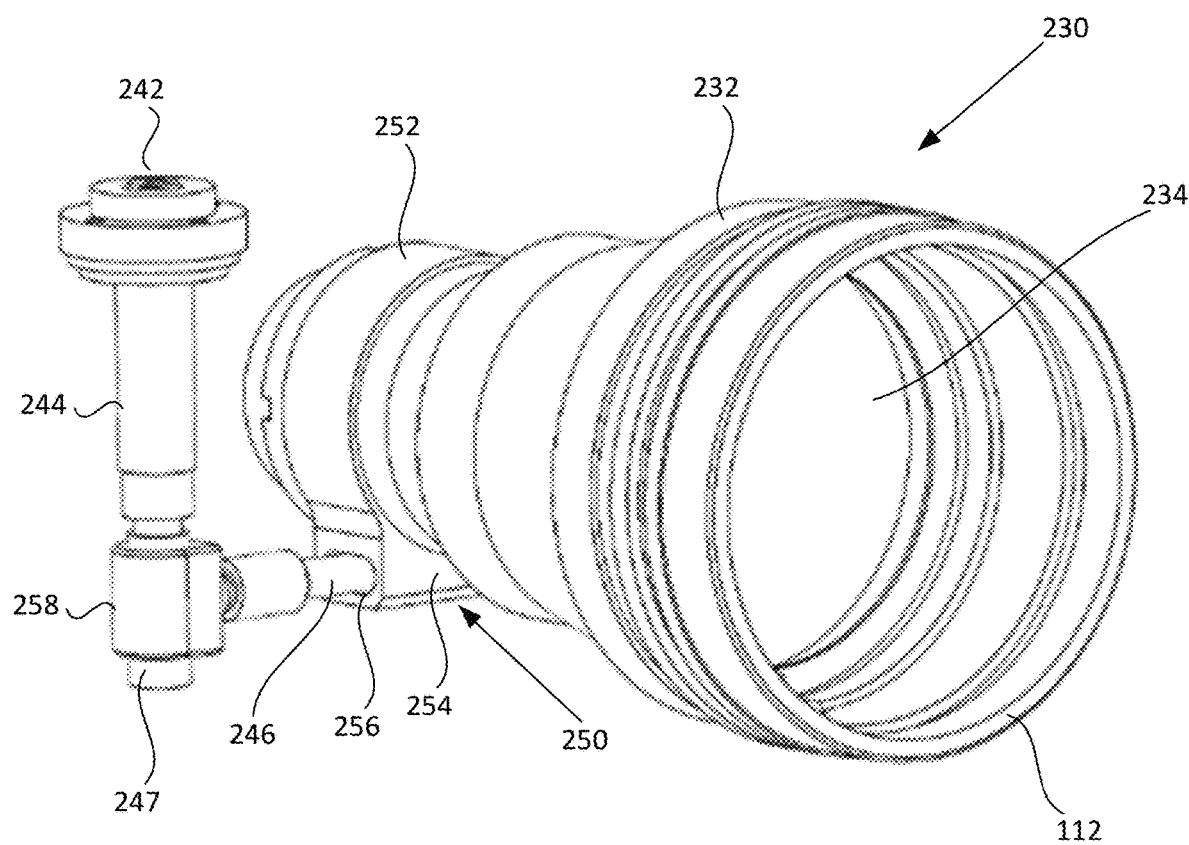
FIG. 3 is substantially a front perspective of an inner housing and elevation adjustment system.
Figure 4:
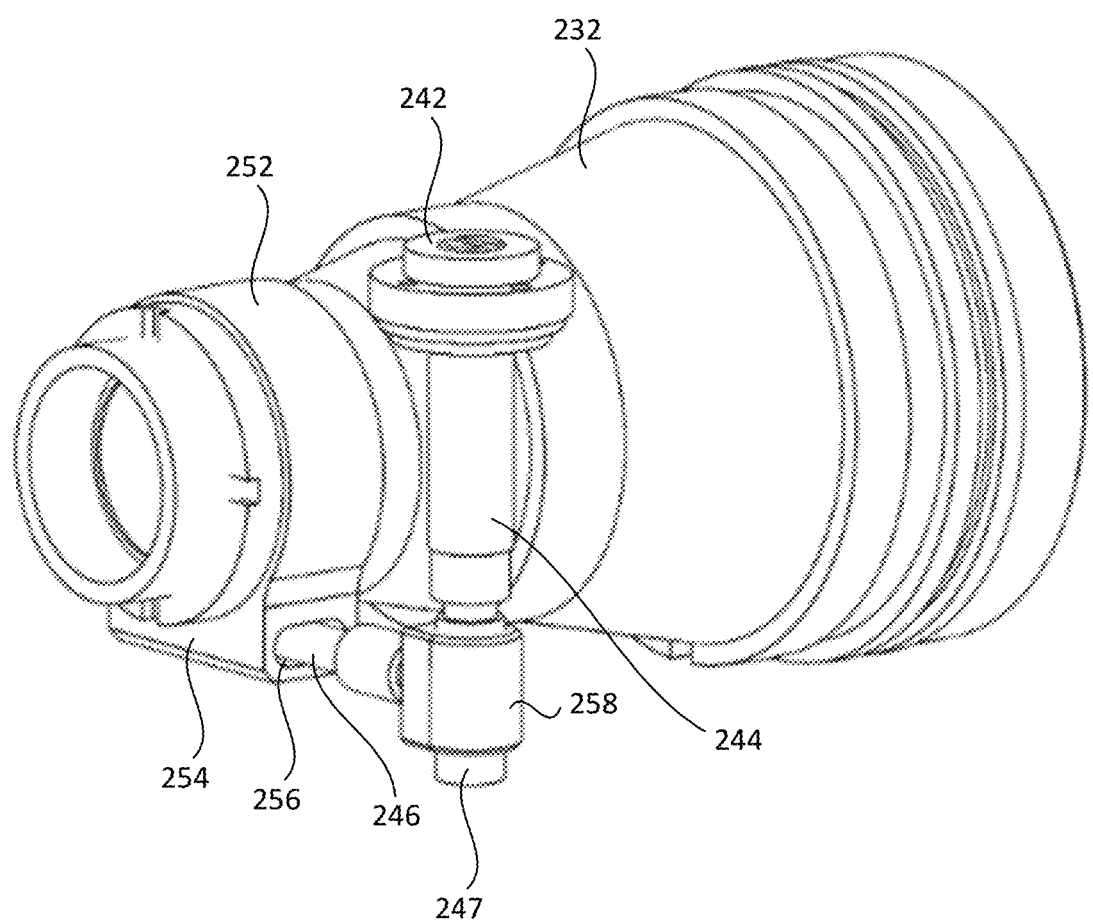
FIG. 4 is substantially a rear perspective of an inner housing and elevation adjustment system.

Because the scopes of FIGS. 1-2 and 6-12 require a line of sight through the upper scope, any adjustment mechanism (elevation and/or windage) must be located out of this line of sight. A laterally mounted adjustment system is therefore required. FIG. 3 shows the objective system 230 from FIGS. 1 and 2 and components of the elevation adjustment mechanism with the outer housing 110 removed. FIG. 4 shows a rear perspective of the same components as FIG. 3. FIGS. 3 and 4 show the inner housing 232 that houses the objective lens elements 234. The elevation adjustment turret 140 is disposed to the side of the inner housing 232 and is connected thereto by the connector element 246. To facilitate connection of the connector element 246, a connector housing 250 is provided. The connector housing 250 includes a connector housing ring 252 that receives the inner housing 232 within the ring and provides a secure engagement therewith. A lower portion 254 of the connector housing 250 beneath the connector housing ring 252 defines an opening or bushing 256 that receives an arm of the connector element 246 and serves as a guide therefore. The connector element 246 connects to the actuator 244 at a threaded sleeve 258 that threadingly engages a threaded end 247 of the actuator spindle 244.

Figure 5:
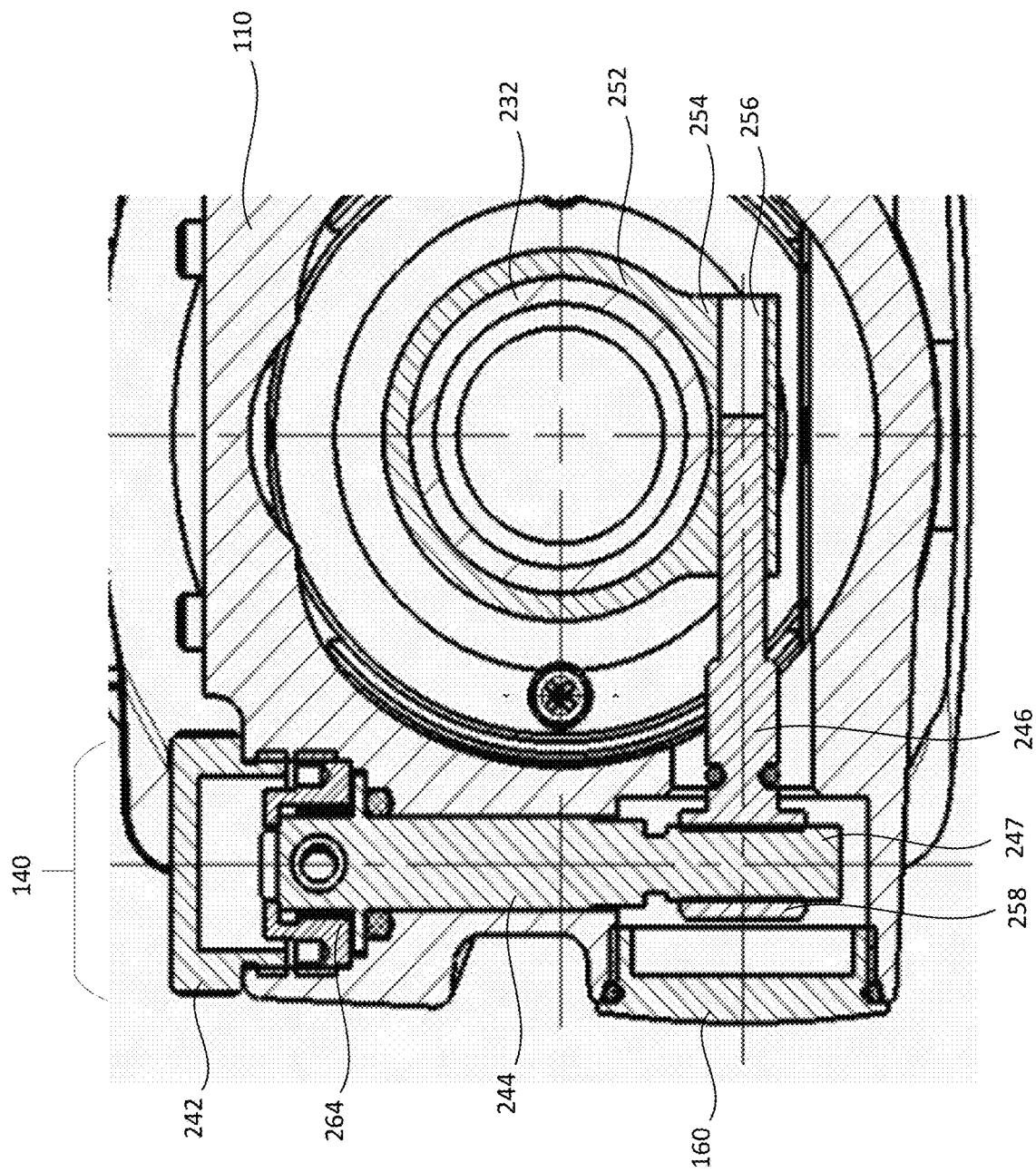
FIG. 5 is substantially a front cross section of the scope.

FIG. 5 shows a front-on cross section of some of the components of the scope 100, including the vertical adjustment mechanism 140. The vertical adjustment mechanism 140 includes a vertical turret 242 that engages the spindle or actuator 244 via a threaded connector 264. Threaded connectors for turrets are known and various forms of the threaded connector and actuation mechanism will be apparent to the person skilled in the art. The adjustment mechanism operates so that as the turret 242 turns, the threaded connector 264 turns, causing the actuator 244 to rotate. An end 247 of the actuator 244 is threaded and connects to the connector element 246 by a threaded sleeve 258. Rotation of the actuator 244 within the sleeve 258 causes the sleeve 258 and connector element 246 to rise or fall depending on the direction of rotation of the turret. The connector element 246 passes from the threaded sleeve 258, into the bushing 256 of the connector housing. As the connector arm 246 rises and falls, it causes the connector housing ring 252 to rise and fall correspondingly. The inner housing 232 that houses the objective group is shifted by the motion of the connector housing ring 252. Because the objective group of lenses moves relative to the aiming marks in the erector group, the zeroed in position of the scope is moved. The connector element 246 fits snugly within the bushing 256. Any movement of the connector arm 246 in the vertical direction, or more generally, in the direction of the elevation adjustment, caused by actuation of the turret will cause corresponding adjustment of the ocular group, with minimal free play.

In the present embodiment, movement of the connector element 246 acts on one end of the objective group through the connector housing ring 252 to cause the objective group 230 to be tilted relative to the erector group 220. Only the rear end of the inner housing of the objective group 230 is tilted relative to the erector system 220 and aiming mark. In this configuration the outer housing 110 serves as a bearing or pivot point. Flexible sealing, e.g. rubber sealing, between the outer housing 110 and the inner housing 232 allows movement. While a tilting mechanism is shown and described, other shifting mechanisms may be employed. For example, the connector element may be disposed more centrally on the objective group 230 rather toward the rear end as described so that the entire objective group is shifted vertically by movement of the connector element.

It can be seen in FIG. 5 that the bushing 256 is longer than the connector element 246 and receives the connector element 248 laterally in a sliding manner. FIG. 5 shows the windage or horizontal adjustment system 160. The horizontal adjustment works in the common market-standard way of a Turret-Spindle configuration that pushes the Inner housing against a spring. It should be noted that in the embodiments depicted, the windage adjustment system 160 is independent of the elevation adjustment system 140 and is not aligned therewith. The windage adjustment may act to shift the inner housing 232 laterally against the action of the spring. As the inner housing is moved laterally, the connector element 248 slides within the bushing 256 to accommodate the lateral movement.

In the presented embodiment the vertical adjustment mechanism operates through forced control in both directions, while the horizontal adjustment works in the common market-standard way of a Turret-Spindle configuration that pushes the Inner housing against a spring. Other arrangements will be apparent to the person skilled in the art.

While the embodiments depicted herein describe the elevation adjustment mechanism acting on an objective group contained within an inner objective group housing, the person skilled it the art will readily understand that alternative configurations are possible for providing a laterally offset adjustment mechanism. For example, a laterally offset elevation adjustment mechanism may also be arranged to act on one or more erector elements, reticules, etc. Alternatively or in addition, a laterally offset adjustment mechanism may be arranged to act on one or more ocular elements.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A scope for use on a firearm, the scope comprising:
   (A) a first housing;
   (B) a primary sight disposed within the first housing, the primary sight comprising a plurality of optical elements disposed within the first housing, the plurality of optical elements comprising:
      an objective group comprising one or more objective optical elements housed within an objective housing that is within the first housing;
      an ocular group comprising one or more ocular group elements and an ocular group axis; and
      an erector group disposed between the objective group and the ocular group;
   the primary sight comprising a primary sighting line;
   (C) a secondary sight comprising a secondary sighting line;
   (D) an elevation adjustment mechanism for adjusting a zeroed-in position of the primary sight, wherein the elevation adjustment mechanism comprises an actuator and a connector element that connects the actuator to the objective housing, wherein actuation of the actuator adjusts the zeroed-in position of the primary sight, wherein the elevation adjustment mechanism is located such that it does not impede the secondary sighting line.

2. The scope of claim 1 wherein the secondary sight is disposed on the first housing.

3. The scope of claim 1 wherein the secondary sight is disposed vertically above the primary sight and wherein the elevation adjustment mechanism is disposed laterally of the primary sight.

4. The scope of claim 1 wherein the elevation adjustment mechanism comprises a vertical turret.

5. The scope of claim 1 wherein the connector element connects to the objective housing to allow for a windage adjustment shift of the objective housing.

6. The scope of claim 1 wherein the connector element is received into a sleeve that is operatively attached to the objective housing, wherein the sleeve allows lateral movement between the connector element and the sleeve during windage adjustment of the primary sight.

7. The scope of claim 1 wherein the primary sighting line and the secondary sighting line define a common sighting plane and wherein the elevation adjustment mechanism is located laterally of the common sighting plane.

8. The scope of claim 1 wherein the primary sighting line converges with the secondary sighting line adjacent an ocular end of the scope.

9. The scope of claim 1 wherein the primary sight comprises a windage adjustment mechanism that is independent of the elevation adjustment mechanism.

10. A scope for use on a firearm, the scope comprising:
    (A) first housing means;
    (B) primary sight means disposed within the first housing means, the primary sight means for providing a primary sight line and comprising a plurality of optical elements disposed within the first housing, the plurality of optical elements comprising:
       an objective group comprising one or more objective optical elements housed within an objective housing that is within the first housing means;
       an ocular group comprising one or more ocular group elements and an ocular group axis; and
       an erector group disposed between the objective group and the ocular group;
    (C) secondary sight means for providing a secondary sighting line;
    (D) elevation adjustment means for adjusting a zeroed-in position of the primary sight, wherein the elevation adjustment means comprises actuator means and connector means that connects the actuator means to the objective housing, wherein actuation of the actuator means adjusts the zeroed-in position of the primary sight, wherein the elevation adjustment means is located such that it does not impede the secondary sighting line of the secondary sight means.

11. The scope of claim 10 wherein the secondary sight means is disposed vertically above the primary sight means and wherein the elevation adjustment means is disposed laterally of the primary sight means.

12. The scope of claim 10 wherein the elevation adjustment means comprises actuator means and connector means for connecting the actuator means to the primary sight means, the actuator means for adjusting the zeroed-in position of the primary sight means.

13. The scope of claim 10 wherein the connector means connects to the objective housing to allow for a windage adjustment shift of the objective housing.

14. The scope of claim 10 wherein the primary sighting line and the secondary sighting line define a common sighting plane and wherein the elevation adjustment means is located laterally of the common sighting plane.

15. The scope of claim 10 wherein the primary sight means comprises windage adjustment means that is independent of the elevation adjustment means.

* * * * *